United States Patent
Park

(10) Patent No.: US 6,260,012 B1
(45) Date of Patent: Jul. 10, 2001

(54) MOBILE PHONE HAVING SPEAKER DEPENDENT VOICE RECOGNITION METHOD AND APPARATUS

(75) Inventor: Joung-Kyou Park, Suwon (KR)

(73) Assignee: Samsung Electronics Co., LTD (KR)

( * ) Notice: Subject to any disclaimer, the term of this patent is extended or adjusted under 35 U.S.C. 154(b) by 0 days.

(21) Appl. No.: 09/260,188

(22) Filed: Mar. 1, 1999

(30) Foreign Application Priority Data

Feb. 27, 1998 (KR) .................................................. 98-6503

(51) Int. Cl.⁷ .................................................. G10L 15/06
(52) U.S. Cl. .................... 704/236; 704/239; 704/243; 704/247; 379/88
(58) Field of Search .................................. 704/236, 246, 704/251, 253, 239, 243, 247; 379/120, 127, 207, 88

(56) References Cited

U.S. PATENT DOCUMENTS

| 4,797,929 | * | 1/1989 | Gerson et al. | 381/43 |
| 4,905,288 | * | 2/1990 | Gerson et al. | 381/43 |
| 5,371,779 | | 12/1994 | Kobayashi | 379/58 |
| 5,640,485 | | 6/1997 | Ranta | 704/251 |
| 5,991,364 | * | 11/1999 | McAllister et al. | 379/88.01 |
| 6,003,004 | * | 12/1999 | Hershkovits et al. | 704/253 |
| 6,134,527 | * | 10/2000 | Meunier et al. | 704/247 |

* cited by examiner

Primary Examiner—William R. Korzuch
Assistant Examiner—Susan McFadden
(74) Attorney, Agent, or Firm—Dilworth & Barrese, LLP

(57) ABSTRACT

An apparatus and method for performing improved speech recognition in a communication terminal, e.g., a mobile phone with a hands-free voice dialing function. In a speech recognition mode, a user's input speech such as a desired called party name, number or a phone command, is converted to feature data and compared to individual pre-stored feature data sets corresponding to pre-recorded speech obtained during a registration process. Difference values representing the respective differences between the current user's input speech and the respective data sets are computed. A first closest (most similar) and second closest feature data set correspond to the first smallest and second smallest difference values so obtained. A closeness threshold is computed as the sum of a small, predetermined threshold and a differential value between the first and second difference values. If the first difference value is less than the computed closeness threshold, then the input speech is determined to match the first feature data set, whereby a positive speech recognition result is obtained. When a match occurs, an automatic dialing operation may be carried out in one application.

21 Claims, 4 Drawing Sheets

MOBILE PHONE HAVING SPEAKER DEPENDENT VOICE RECOGNITION METHOD AND APPARATUS

BACKGROUND OF THE INVENTION

1. Field of the Invention

The present invention relates to a technique for improved speech recognition in a telephone, particularly a mobile telephone, such as for automatic hands-free dialing.

2. Description of the Related Art

In recent years, telephones have become equipped with optional speech recognition circuitry to enable special hands-free functions to be carried out, such as automatic hands-free dialing. In the mobile phone environment, hands-free dialing by speech recognition is particularly useful to enable users to place calls while driving by reciting a name or number of a party to be called (called party). The mobile phone is equipped with a speech recognition circuit to convert the user's speech into audio feature data. Typically, the feature data is compared to different sets of pre-stored feature data corresponding to names previously recorded by the user during a registration process. If a match is found, the number corresponding to the name is automatically dialed.

According to a conventional speech recognition method applied to a Code Division Multiple Access (CDMA) mobile phone or the like, a match between the user's current speech and a pre-recorded called party name is established by comparing the current feature data (corresponding to the current speech) with each set of pre-stored feature data to determine the most similar data set. If the difference between the most similar data set and the current feature data is below a predetermined threshold, then the most similar data set is determined to match the current speech. Once a match is established, the telephone number of the called party corresponding to the most similar data set may be automatically dialed. On the other hand, if the difference is above the threshold, a matching condition will not be established. Note that a match will be made between a wrong called party if the wrong called party's feature data happens to be closest to the current feature data, with differences below the threshold. Another problem may occur when more than one recorded feature data set is highly similar to current feature data, with differences between each highly similar set and the current data less than the threshold. In this case, the user may be prompted to repeat the utterance or perform some other task to identify which called party name is intended.

The above approach of utilizing a fixed threshold (or thresholds) for determining whether an input utterance matches a pre-recorded name, ignores the fact that varying environmental conditions such as inherent features of pronounced vocal data, personal differences in pronunciation, etc., may be present at any given time. Consequently, a false recognition or a recognition error may be caused, resulting in an undesired party being called or excessive non-recognition of utterances.

One example of a prior art technique designed to increase the success rate of hands-free dialing using speech recognition is presented in U.S. Pat. No. 5,640,485. In this patent, when an utterance is determined to be outside a predetermined closeness threshold to all pre-recorded words, then the user is prompted to repeat the utterance, and a new closeness threshold is computed based on the pair of utterances. While this technique may have some benefit in improving dialing success rates, the repetition requirement is an inconvenience to the user.

SUMMARY OF THE INVENTION

It is therefore an object of the present invention to provide an apparatus and method for achieving more reliable and effective speech recognition in a communication terminal.

To achieve the above and other objects, there is disclosed in one aspect of the invention an apparatus and method for performing improved speech recognition in a communication terminal, e.g., a mobile phone with a hands-free voice dialing function. In a speech recognition mode, a user's input speech such as a desired called party name, number or a phone command, is converted to feature data and compared to a number of individual pre-stored feature data sets corresponding to pre-recorded speech obtained during a registration process. Difference values representing the respective differences (or similarity) between the current user's input speech and the respective data sets are computed. A first closest (most similar) and second closest feature data set correspond to the first smallest and second smallest difference values so obtained. A new closeness threshold is computed as the sum of a small, predetermined threshold and a differential value between the first and second difference values. If the first difference value is less than the computed closeness threshold, then the input speech is determined to match the first feature data set, whereby a positive speech recognition result is obtained. When a match occurs, an automatic dialing operation may be carried out in one application. Advantageously, the dynamic computation of a new closeness threshold based on the first and second difference values improves the success rate in matching input speech with stored speech.

In another aspect of the invention, an apparatus for decision of voice recognition data in a cellular phone with a voice recognition dialing function includes: a memory having a first region for registration of feature data with respect to an input voice, a second region for storing a number of trials upon every recognition with respect to the feature data, a third region for storing an accumulative mean value with respect to a series of threshold values obtained from a corresponding number of trials, stored in the second region to and through the preceding number of trials, and a fourth region for storing a specified threshold value; a vocoder for generating packet data according to an input voice; a voice recognition means for analyzing the packet data currently provided from the vocoder to thereby generate corresponding feature data, comparing the generated feature data with feature data of reference voices pre-registered in the memory to thereby search any similar data, and if it is searched the similar data, then outputting an index of the searched feature data and a difference value between the generated feature data and the registered feature data; and a controller for comparing the difference value outputted from the voice recognition means with a predetermined threshold value, so that if the difference value is less than the threshold value, then the feature data corresponding to the index are read out from the memory and delivered to the vocoder, calculating an accumulative mean value of threshold values for every trial of recognition with respect to the feature data to and through the present time, the accumulative mean value being stored in the third region of the memory, and by reflecting the accumulative mean value into the threshold value, updating the threshold value stored in the fourth region of the memory.

BRIEF DESCRIPTION OF THE DRAWINGS

The above and other objects, features and advantages of the present invention will become more apparent from the following detailed description when taken in conjunction with the accompanying drawings in which like reference numerals indicate like parts. In the drawings.

DETAILED DESCRIPTION OF THE PREFERRED EMBODIMENT preferred embodiment of the present invention will be described hereinbelow with reference to the accompanying drawings. In the following description, well known functions or constructions are not described in detail since they would obscure the invention in unnecessary detail.

Figure 1:
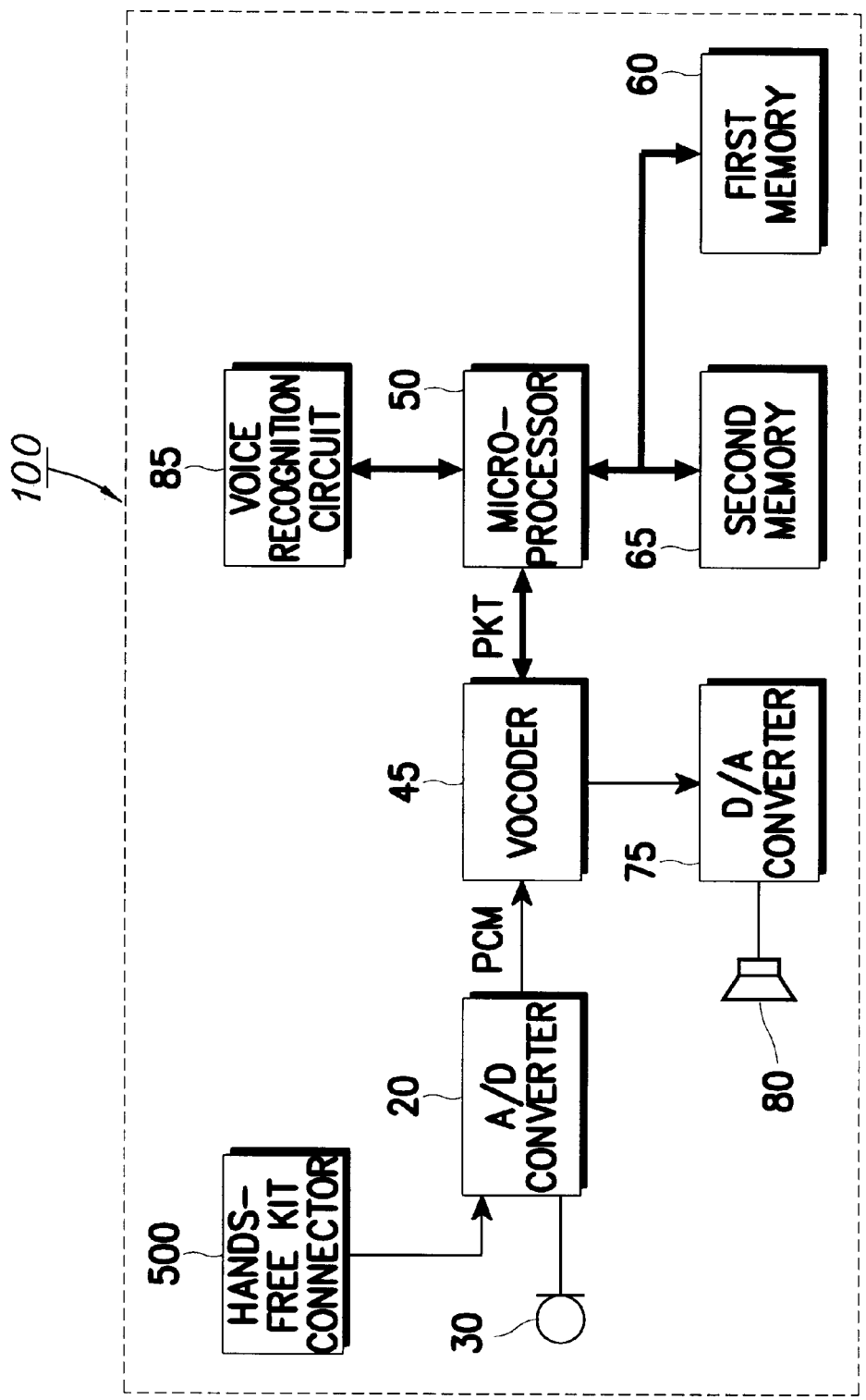
FIG. 1 is a block diagram of a mobile phone with speech recognition capability according to a preferred embodiment of the present invention.

Referring now to FIG. 1, reference numeral 100 designates a portion of a speech recognition mobile (cellular) phone in accordance with the invention is shown, designated as 100. The radio frequency (RF) portion and DTMF (Dual Tone Multi-Frequency) portion of the phone are omitted from the figure for clarity of presentation. An analog voice signal inputted through a microphone 30 is converted into a digital PCM (Pulse Code Modulation) signal by means of an analog-to-digital (A/D) converter 20. This PCM signal is delivered to a vocoder 45, which compresses the PCM signal to generate packet data therefrom. The vocoder 45, for example, may be embodied with an 8K QCELP (Q Code Excited Linear Prediction) system for a CDMA digital mobile phone and/or with an RPE-LTP (Regular Pulse Excitation with Long Term Prediction) system for GSM (Global System for Mobile communication).

The packet data PKT outputted from the vocoder 45 is supplied to a microprocessor 50 that controls the overall operation of the digital cellular mobile phone. A first memory unit 60 may be a non-volatile memory such as a flash memory or an EEPROM, etc., having stored therein a set of system control programs necessary for the overall operation of the digital mobile phone and various initial service data. A second memory 65 may be a RAM for storing various temporary data applied during user operation of the phone. A voice recognition (i.e., speech recognition) circuit 85 generates suitable audio feature data responsive to an input utterance. By way of example, the feature data can be 200 bytes per second and represented by spectral or cepstral parameters, signal amplitude and/or alteration of amplitude, or combinations thereof. Speech recognition techniques are well known in the art—therefore, the detailed methodology by which the audio feature data is extracted from input speech is omitted from the present discussion. The voice recognition means 85 may be implemented either as a set of hardware elements, a software program running on a microprocessor 50, or via a combination of hardware and software. When implemented in software, it may be included within the first memory 60 of the phone without a separate circuit component as depicted in FIG. 1.

Microprocessor 50 controls all the basic operation of the digital mobile phone and performs a speech recognition decision function in accordance with the invention to be described in detail below. Briefly, the speech recognition decision function involves the dynamic computation of difference thresholds for determining whether an input utterance matches any one of a plurality of pre-recorded names. The packet data PKT outputted from the vocoder 45 are delivered to voice recognition means 85, and the feature data and the difference value output from the voice recognition means 85 are used to control a voice dialing operation (hands-free dialing) in the phone. After the microprocessor has performed a suitable speech recognition operation, it reads out stored voice data corresponding to the recognized (pre-stored) feature data to notify the user that speech recognition is complete. The voice data, e.g., corresponding to a recognized name, are then supplied to the vocoder 45 where the data are converted to a PCM signal and then provided to a digital-to-analog (D/A) converter 75. After the PCM signal has been converted to an analog signal in D/A converter, the signal is amplified into an audible signal or tone in a speaker 80. Thus, for example, when the user utters a called party name in the voice dialing mode of the telephone 100, and the speech recognition system recognizes the name as corresponding to a pre-recorded name, it reports such recognition to the user, preferably by reproducing the original recording. The system may then immediately perform automatic dialing or await a verbal confirmation command (e.g., "go" or "dial") by the user before proceeding to dial.

Hands-free kit connector 500 is used for connection between a conventional hands-free kit and a terminal equipment, and serves to provides the A/D converter 20 with a voice signal received from hands-free kit microphone 30.

Figure 2:
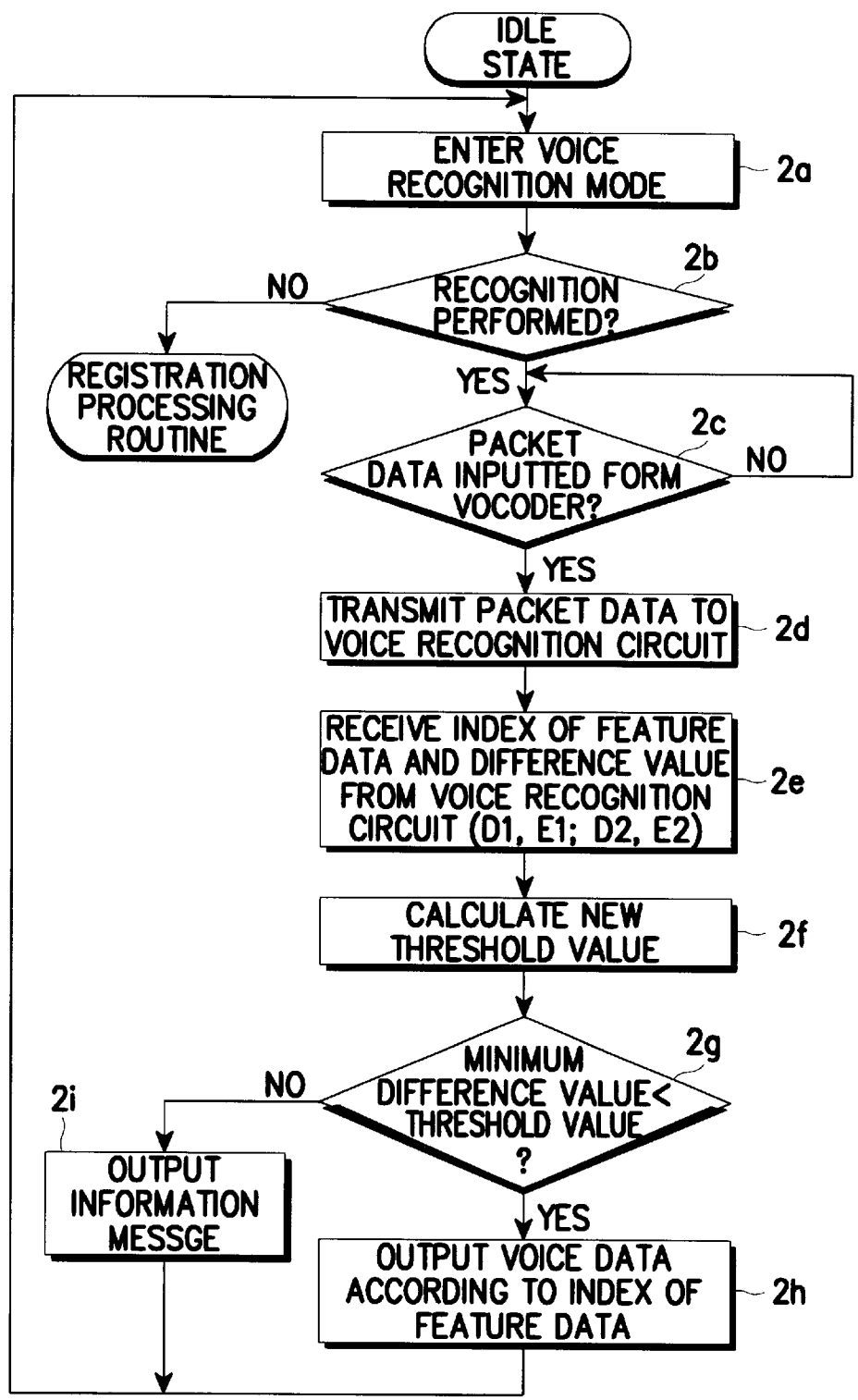
FIG. 2 is a flowchart illustrating a speech recognition method for a mobile phone according to a first preferred embodiment of the present invention.

Referring now to FIG. 2, a method for making a speech recognition decision in the speech recognition cellular phone according to a first preferred embodiment of the present invention is explained in further detail. In this embodiment, it is assumed that a phone user (calling party) utters a called party name to make a call to a desired called party. Before the user uses the voice dialing feature, he will usually select a specified key on the phone to enter a voice dialing mode, which key input is detected in Step 2a by microprocessor 50. In Step 2b, it is determined whether a registration mode or recognition mode is to be entered via the detection of a specific key input or speech command. In the registration mode, the system records called party names uttered by the user along with associated telephone numbers. The uttered called party names are stored along with feature data extracted from the utterances.

If the recognition mode is selected in Step 2b, the routine proceeds to Step 2c, where it is determined if packet data outputted from the vocoder 45 in response to a voice input of the user are received. If so, these packet data are delivered to the voice recognition means 85 in Step 2d. In Step 2e, an index of similar feature data and their corresponding difference values are received from the voice recognition means 85. This index of feature data is an index registered in advance in a memory of the phone, corresponding to feature data obtained with respect to a given input voice. Thus, there may be several indexes, each corresponding to a different user. When the current user speaks in the voice dialing mode, the speech recognition system analyzes the speech for particular characteristics and based upon the analysis is able to determine who the speaker is from a list of stored speakers. A stored index of pre-registered feature data of called party names for the selected speaker is then selected by voice recognition means 85. The corresponding difference values each correspond to a difference between the pre-registered (stored) feature data and feature data of the present input speech. The voice recognition means 85 compares in sequence the feature data of the present input speech with the pre-registered feature data in the first memory 60 to thereby select feature data having the smallest difference values and the second smallest difference values. In other words, the system determines: the feature data set D1 of the closest called party name to the present input speech as well as an associated first difference value E1 representing the amount of difference between the feature data set D1 and the input feature data (of the input speech); and the second closest feature data set D2 of the second closest name and the associated second difference value E2 between D2 and the input feature data.

In step 2f, a "closeness" threshold value is either retrieved from memory or newly computed. This threshold is utilized to determine whether the input speech is close enough to one of the pre-recorded calling party names to conclude that a match has occurred between the input speech and the closest name. A predetermined, small closeness threshold is initially stored in memory and retrieved. As will become more apparent below, when the difference value between the input speech and the closest called party name is higher than this predetermined threshold, the closeness threshold is newly computed in step 2f based on the difference values of the first closest name and the second closest name.

The microprocessor determines in Step 2g whether the least difference value is less than the predetermined threshold value, in case more than two pairs of an index of the similar feature data and a corresponding difference value are provided thereto. As a result of the above comparative operation, if the least difference value is less than a predetermined threshold value, then it is controlled to decide that the corresponding recognition has been correctly carried out and to proceed with a next Step 2h in which recorded voice data matching to the corresponding feature data index are retrieved from the first memory 60 and transmitted to the vocoder 45 in Step 2h, while if it is not less than the predetermined threshold value then it is controlled to proceed to Step 2i in which an information message prerecorded (for example, "please say it again") is read out of the first memory 60 and provided to the vocoder 45. The vocoder processes the above voice data and information message read out from the first memory and sends the same to D/A converter 75, which voice data and information message are then converted to an analog signal to provide audible message or name at the speaker 80.

In the present embodiment, each destination phone number corresponding to a given input voice with respect to a desired called party was registered in advance in the first memory 60 in a voice dial registration procedure by the user. In the voice dial mode, if the speech recognition process results in a match of the input speech with one of the called party names, the registered phone number for the matched called party is retrieved to a DTMF generator (not shown in the drawing) to a dialing to the desired called party.

The threshold value computed in step 2f is used to decide whether or not the closest pre-recorded name should be considered a match for the input speech in the voice dialing mode. The threshold value can be computed as follows: For example, assuming that the voice recognition means 85 provides the most similar data D1 and its corresponding difference value E1, and the second similar data D2 and its corresponding difference value E2, the microprocessor 50 calculates a subtraction (E2 minus E1) between the above two difference values E1 and E2 to render therefrom a new threshold value. Here, multiplication of the subtracted value (E2 minus E1) by a specified weighted value makes it possible to change the relationship between a recognition rate and an error probability, and the above new threshold value can be expressed as:

Threshold Value=(Threshold Value)+
(Weighted Value)*(E2−E1) <Expression1>

By way of example to illustrate the above principle, assuming that from the voice recognition means 85, a difference value E1 for the most similar data D1 is "100", a difference value E2 for the second most similar data D2 is "150", and a difference value E3 for the third most similar data D3 is "350", when a predetermined threshold value for a correct speech recognition has been set to "60", then the new threshold value from the aforesaid formula would be 60+(150−100)=110 (for a weighted value of 1.0). Therefore, as the smallest difference value "100" is less than the new threshold value "110", the microprocessor determines that a correct recognition has been carried out, whereby the above data D1 is determined as final recognition data.

As another example, assuming that from the voice recognition means a difference value E1 for the most similar data D1 is provided as "80", a difference value E2 for the second most similar data D2 is provided as "90", and a difference value E3 for the third most similar data D3 is provided as "350", when a predetermined threshold value for a correct speech recognition has been set to "60", then the new threshold value from the aforesaid formula would be "70" (for a weighted value of 1.0). Thus, as the smallest difference value "80" exceeds the new threshold value "70", the microprocessor determines that there are no recorded feature data, i.e., "no answer" as a result of the speech recognition.

Figure 3:
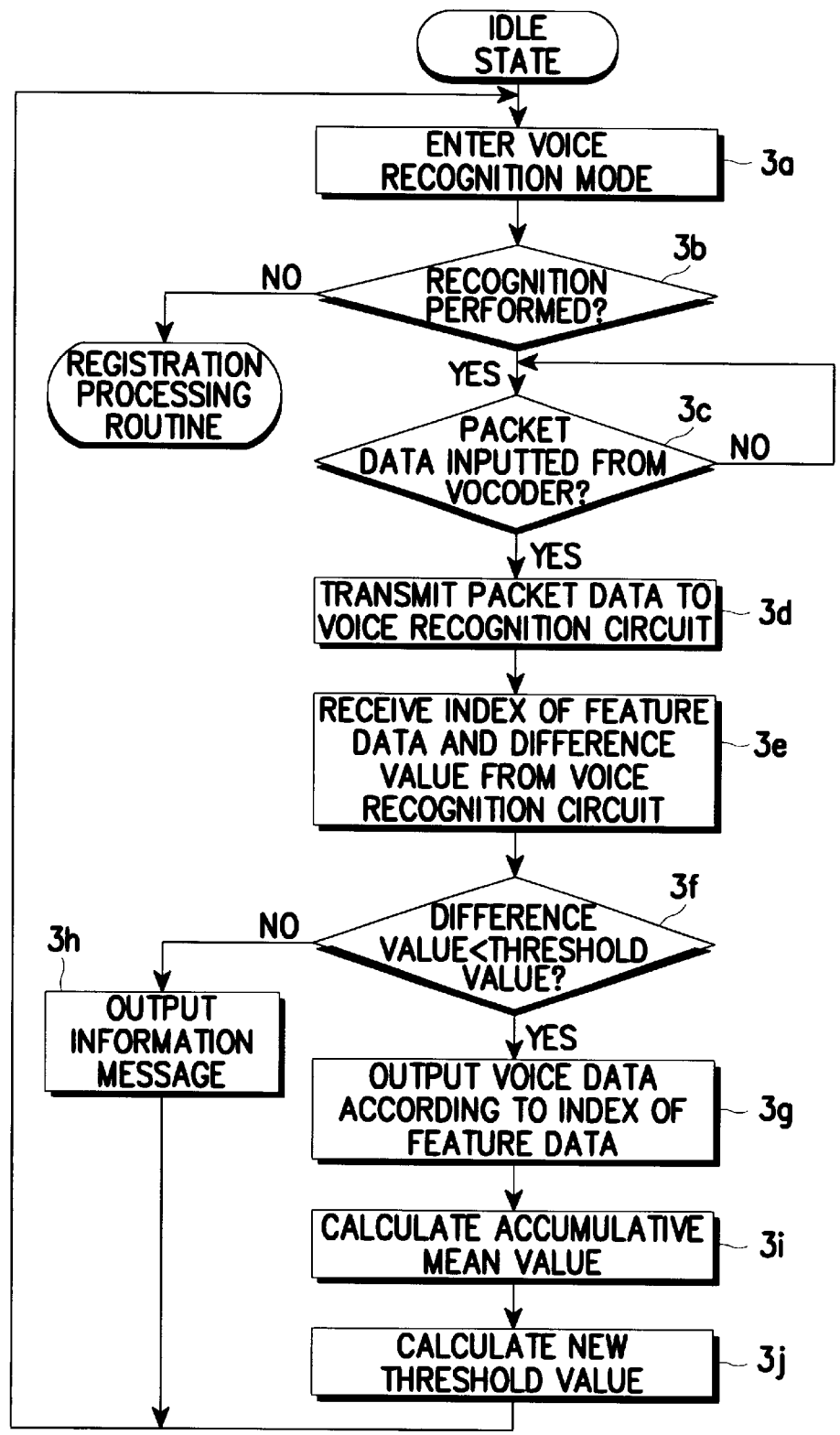
FIGS. 3 and 4 are flowcharts illustrating respective speech recognition methods for a mobile phone according to alternative embodiments of the present invention.

Referring to FIG. 3, a flowchart illustrating alternative embodiments of speech recognition methods in accordance with the present invention is shown. In one of these embodiments (second embodiment), at least one memory location per voice data entry is assigned, and a mean value, a standard deviation value and a number of trials are then stored in the memory. More specifically, during a training phase of the speech recognition mode, which is part of the registration process, the user is prompted to record entries, e.g., called-party names, to be recognized in an active speech recognition mode such as voice dialing. The recordings are converted to audio feature data sets which are stored in respective memory locations. Once the entries are recorded, the user is prompted to utter a specific entry several times. Each time an utterance is repeated, the speech recognition system converts the repeated utterance to audio feature data, so as to generate statistics for the corresponding entry. This process is repeated for each repeated utterance in the trials to thereby generate the above-mentioned mean and standard deviation for each recorded entry.

On the basis of the above values and number of trials, a threshold value is subsequently computed. Optionally, a different threshold may be computed for each entry. The standard deviation value represents a mathematical deviation of respective data. The threshold value can be obtained from either one of the following expressions 2 and 3:

Threshold Value=(Mean Value)+(Weighted Value)*
(Standard Deviation) <Expression2>

Threshold Value=(Constant)+(Weighted Value)*
(Mean Value) <Expression 3>

Referring still to FIG. 3, the flowchart depicts a speech recognition mode routine which utilizes the threshold of expression (2) or (3). Steps 3a–3e are the same as steps 2a–2e, respectively, of FIG. 2. In step 3f, the microprocessor determines whether the difference value (with respect to current input speech) for each stored called party name is less than the predetermined threshold value, i.e., the threshold computed in accordance with expression (2) or (3). With respect to the current input speech, if the smallest difference value among the difference values of the various stored entries is less than the predetermined threshold value, then it is concluded that the corresponding recognition has been correctly carried out and the routine proceeds to step 3g. In step 3g, the recorded voice data matching the corresponding feature data index are retrieved from the first memory 60 and then transmitted to the vocoder 45. On the other hand, if the smallest difference value exceeds the predetermined threshold value then the routine proceeds to Step 3h where an information message pre-recorded (for example, "please say it again") is read out of the first memory 60 and then provided to the vocoder 45. The vocoder processes the voice data or the information message read out from the first memory and forwards the same to D/A converter 75, which voice data or information message is then converted to an analog signal to provide an audible output at the speaker 80. Thus, in the former case of step 3g where a match between the current utterance and one of the entries has occurred, the matched recorded entry (e.g., called party name) is reproduced by the speaker to allow the user to verify the same. Such verification is preferred in a voice dialing mode in order to prevent the system from dialing the telephone number of the wrong party when a speech recognition error occurs. As mentioned above, the user will verify that the name is correct by uttering a prompted phrase such as "go" or "dial", which is recognized by the speech recognition system.

Subsequent to Step 3g, the microprocessor computes an accumulative mean value to a corresponding entry in Step 3i and then proceeds to Step 3j to compute a new threshold value reflecting the accumulative mean value, which computed value is used as an updated new threshold value in the subsequent speech recognition. Thereafter, the control returns to the Step 3a again. This updated threshold value is to compensate for feature error of a corresponding entry, which may be a name in the preferred embodiment. For example, the name "Jung Kyu PARK" will be pronounced much differently than "Kil Dong HONG", but the former name "Jung Kyu PARK" will be often confusingly understood as "Sung Kyu PARK". Accordingly, in order to perform a correct speech recognition between similar names such as "Jung Kyu PARK" and "Sung Kyu PARK", a permissible error when pronouncing the same name several times should be properly reflected in the speech recognition system. Thus, whenever recognizing a pronunciation of the name "Jung Kyu PARK", its present threshold value is accumulated to a preceding threshold value to thereby produce its mean value which is updated to a new threshold value.

In other words, during the registration process of the speech recognition mode, once mean values are established for each entry, the speech recognition system computes the similarity between the various entries (feature data sets) using an appropriate distance measure. When two entries are determined to be similar, the mean threshold values for the respective similar entries are reduced so as to reduce the occurrence of subsequent recognition errors among the similar entries. Further, during subsequent system operation as in the voice dial mode, after each successful recognition, the mean value for that entry is adjusted in step 3i to reflect the additional feature data of the current utterance, and a new threshold based thereupon is computed in step 3j.

According to the third embodiment of the invention (second alternative embodiment) a total mean value is obtained from a mean value to each entry and a standard deviation is obtained therefrom, on the basis of which a new threshold value is calculated. This is to compensate for personal differences. That is, during the registration process, more than one user is allowed to utter the stored entries when establishing the mean values for the respective entries. This operation can be effectively carried out in a manner done in the second embodiment with reference to FIG. 3 if the aforementioned steps 3i and 3j are properly modified. The new threshold value according to the third embodiment can be calculated from either of the following expressions 4 and 5:

Threshold Value=(Total Mean Value)+(Weighted Value)*(Standard Deviation) <Expression4>

Threshold Value=(Constant)+(Weighted Value)*(Total Mean Value) <Expression5>

Figure 4:
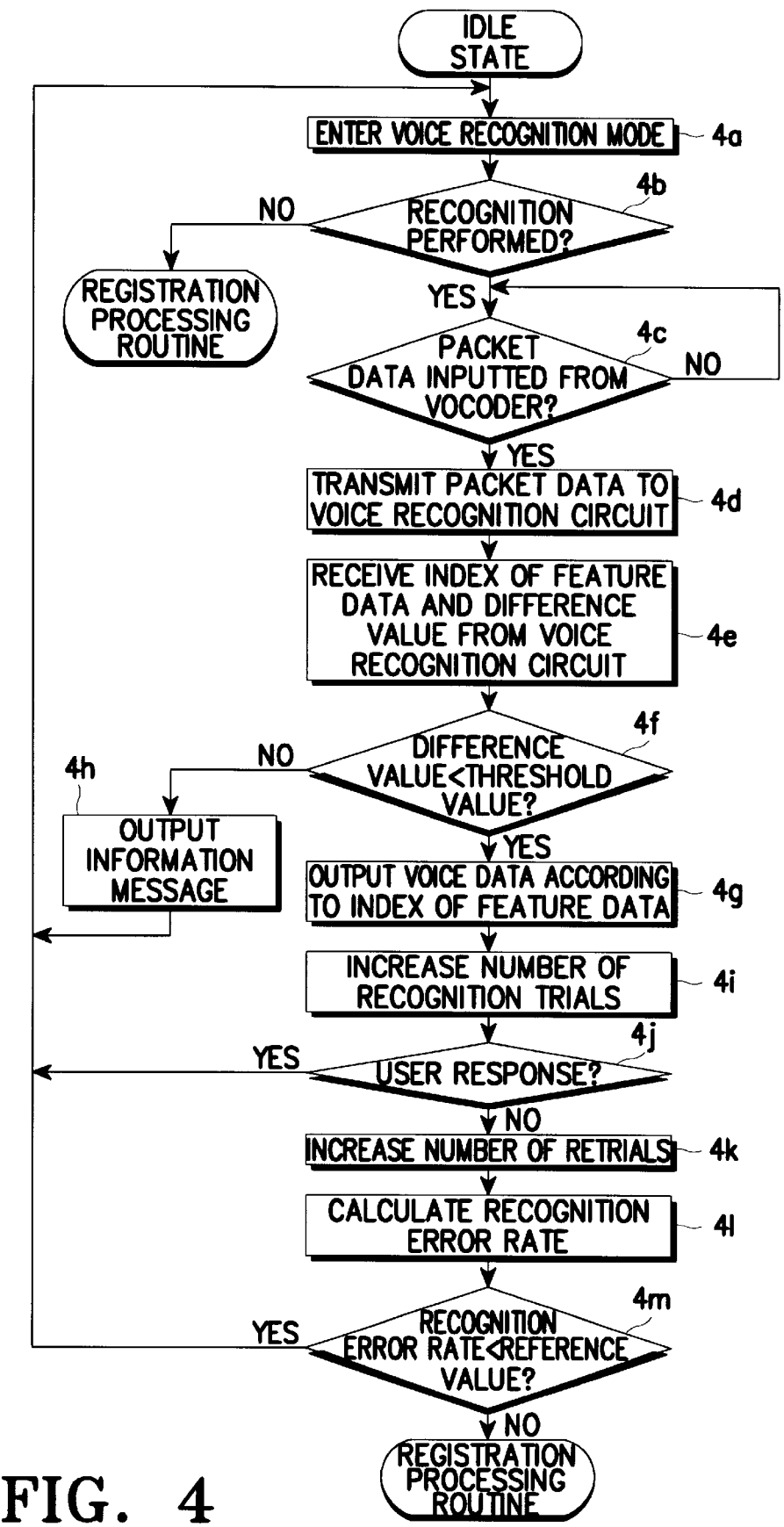

Referring now to FIG. 4, the shown flowchart illustrates a speech recognition method in a communication terminal in accordance with a fourth preferred embodiment of the present invention. In this embodiment, a number of occurrences of recognition errors with respect to a respective entry is recorded, so that a proportion of recognition errors with respect to a total number of recognition trials, that is, a recognition error rate, is calculated therefrom. If the recognition error rate is abnormally high, this implies that the registered voice entry may not be in a good condition, and needs to be deleted or re-registered.

Steps 4a–4h of FIG. 4 are identical to Steps 3a–3h of FIG. 3. Steps 4i to 4m are typically performed in a training/trial mode of the speech recognition mode. During this trial mode, the recognition error rate is calculated for each entry, and if it is too high, the user is prompted to re-record the entry.

In Step 4i, microprocessor 50 increases a number of recognition trials by a unit number and proceeds to Step 4j to check whether there is a response from a user. If no response has been detected then it proceeds to Step 4k to increase a number of recognition retrials by a unit number, for example, "1" and calculates in Step 4l the rate of recognition error. In Step 4m, the rate of recognition error obtained is compared to a predetermined reference value, for example, 50%. According to the comparison, if the rate of recognition error is less than the reference value, the control returns to Step 4a so as to perform a re-recognition, while if the rate of recognition error obtained exceeds the reference value, then the control is transferred to a registration processing routine so as to perform a re-registration procedure assuming that a registration error occurred upon an initial registration of corresponding voice data. In the meantime, when a response from a user has been detected in Step 4j, it is concluded that a correct recognition has been made, whereby the routine returns to Step 4a. In the foregoing description, the rate of recognition error corresponds to a value in which the number of retrials is divided by the number of trials.

As described above, embodiments of the present invention can efficiently reduce the rate of recognition error in a voice dial mode of a communication terminal by utilizing the statistical features of the respective entry difference value and further, decrease the probability of missed voice recognition.

While the invention has been shown and described with reference to certain preferred embodiments thereof, it will be understood by those skilled in the art that the present invention is not limited to these embodiments. For example, the invention may be practiced in wireline telephones with speech recognition circuitry as well as in wireless mobile phones. Therefore, the present invention should be understood as including all possible embodiments and modifications which fall within the spirit and scope of the invention as defined by the appended claims.

What is claimed is:

1. An apparatus for performing speech recognition in a communication terminal with a voice dialing function, comprising:
- a memory having a first region for registration of feature data with respect to an input voice, a second region for storing a number of trials upon every recognition with respect to the feature data, a third region for storing an accumulative mean value with respect to a series of threshold values obtained from a corresponding number of trials, stored in the second region to and through the preceding number of trials, and a fourth region for storing a specified threshold value;
- a vocoder for generating packet data according to an input voice;
- a voice recognition means for analyzing the packet data currently provided from the vocoder to thereby generate corresponding feature data, comparing the generated feature data with feature data of reference voices pre-registered in the memory to thereby search any similar data, and if it is searched the similar data, then outputting an index of the searched feature data and a difference value between the generated feature data and the registered feature data; and
- a controller for comparing the difference value outputted from the voice recognition means with a predetermined threshold value, so that if the difference value is less than the threshold value, then the feature data corresponding to the index are read out from the memory and delivered to the vocoder, calculating an accumulative mean value of threshold values for every trial of recognition with respect to the feature data to and through the present time, the accumulative mean value being stored in the third region of the memory, and by reflecting the accumulative mean value into the threshold value, updating the threshold value stored in the fourth region of the memory.

2. The apparatus as claimed in claim 1, wherein the updated threshold value is a value that a standard deviation multiplied by a given weighted value is added to the accumulative mean value.

3. A method for performing speech recognition in a communication terminal equipment, comprising the steps of:
- (a) entering a speech recognition mode;
- (b) upon receipt of a voice input in the speech recognition mode, processing the voice input and transmitting the processed voice input to a speech recognition circuit;
- (c) receiving from the voice recognition means previously stored first data, being most similar to the processed voice input, and previously stored second data, being second most similar thereto, together with first and second difference values corresponding to the first and second data respectively, and then calculating a new threshold value based on a differential value between the first and second difference values; and
- (d) comparing the new threshold value with the first difference value, and if the first difference value is less than the new threshold value, generating an audible output of speech corresponding to said first data.

4. The method as claimed in claim 3, further comprising the step of providing an information message when the first difference value exceeds the new threshold value in step (d).

5. The method as claimed in claim 3, wherein the new threshold value is substantially equal to a value that the differential value between the first and second difference values, multiplied by a given weighted value, is added to a preceding threshold value.

6. The method as claimed in claim 3, wherein the first difference value is less than the second difference value.

7. A speech recognition method in a communication terminal, comprising the steps of:
- (a) entering a speech recognition mode;
- (b) upon receipt of a voice input in the speech recognition mode, processing the voice input and transmitting the processed voice input to a speech recognition circuit;
- (c) receiving from the speech recognition circuit previously stored first data that are most similar to a the processed voice input, and previously stored second data that are second most similar thereto, together with first and second difference values corresponding to the first and second data respectively;
- (d) comparing a predetermined threshold value with the first difference value, and if the first difference value is less than the predetermined threshold value, then generating an audible output of speech corresponding to the first data; and
- (e) calculating an accumulative mean value for preceding threshold values obtained from every last recognition with respect to the voice data, in order to compensate for an error resulting from selection of feature data of the corresponding voice data subsequently to the above step (d), and reflecting the calculated accumulative mean value into the present threshold value to thereby set a new threshold value, thereafter returning to the above step (b) of transmitting.

8. The method as claimed in claim 7, wherein the new threshold value is substantially equal to a value that a standard deviation value multiplied by a given weighted value and the present threshold value are added together.

9. The method as claimed in claim 7, wherein the new threshold value is substantially equal to a value that a standard deviation value multiplied by a given weighted value and the accumulative mean value are added together.

10. The method as claimed in claim 7, wherein the new threshold value is substantially equal to a value that the accumulative mean value multiplied by a given weighted value and the present threshold value are added together.

11. The method as claimed in claim 7, further comprising the step of providing a message informing a user that the corresponding voice data have not been registered, in case where the first difference value is no less than the threshold value, in the above step (d).

12. A method for performing speech recognition in a communication terminal, comprising the steps of:
- (a) entering a speech recognition mode;
- (b) upon receipt of a voice input in the speech recognition mode, processing the voice input in the form of packet data and then transmitting the processed voice input to a speech recognition circuit;
- (c) receiving from the speech recognition circuit a first set of data being most similar to a pre-registered voice feature, and a second set of data being second most similar thereto, together with first and second difference values corresponding to the first and second set of data respectively;
- (d) comparing a predetermined threshold value with the first difference value, so that if the first difference value is less than the predetermined threshold value, then an audible tone responsive to a corresponding voice data is reproduced in a speaker; and
- (e) calculating an accumulative mean value for preceding threshold values obtained in every past recognition with respect to all the recorded voice data, in order to compensate for an error resulting from a diversity of users subsequently to reproduction in the above step (d), and adding the calculated accumulative mean value multiplied by a weighted value to the present threshold value to thereby set up a new threshold value, then returning to the above step (b).

13. The method as claimed in claim 12, wherein the new threshold value is substantially equal to a value that a standard deviation value multiplied by a given weighted value and the accumulative mean value are added together.

14. The method as claimed in claim 12, wherein the new threshold value is substantially equal to a value that a standard deviation value multiplied by a given weighted value and the present threshold value are added together.

15. The method as claimed in claim 12, wherein the new threshold value is substantially equal to a value that the accumulative mean value multiplied by a given weighted value and the present threshold value are added together.

16. The method as claimed in claim 12, further comprising the step of providing a message informing a user that the corresponding voice data have not been registered, in case where the first difference value is no less than the threshold value, in the above step (d).

17. A method for performing speech recognition in a communication terminal, comprising the steps of:

(a) entering a speech recognition mode;

(b) upon receipt of a voice input in the speech recognition mode, processing the voice input in the form of packet data and then transmitting the processed voice input to a speech recognition circuit;

(c) receiving from the speech recognition circuit a first set of data being most similar to a pre-registered voice feature, and a second set of data being secondly similar thereto, together with first and second difference values corresponding to the first and second set of data respectively;

(d) comparing a predetermined threshold value with the first difference value, so that if the first difference value is less than the predetermined threshold value, then an audible tone responsive to a corresponding voice data is reproduced in a speaker; and (e) determining whether a response from a user is detected, and calculating a rate of recognition error upon absence of a said response, and if the calculated rate of recognition error is less than a predetermined reference value, then returning to the step (b) for re-recognition of the voice input.

18. The method as claimed in claim 17, further comprising the step of determining that there existed an error upon an initial registration of the corresponding voice data, in case where the calculated rate of recognition error is no less than the predetermined reference value, and then proceeding to a registration processing routine for enabling a re-registration.

19. The method as claimed in claim 17, further comprising the step of determining that upon detection of the response of the user, a normal recognition has been carried out, and increasing a number of trials by a unit value, thereafter returning to the preceding step (b).

20. The method as claimed in claim 19, further comprising the sub-step of increasing a number of retrials by a unit value prior to calculation of the rate of recognition error upon absence of detection of the response from the user in the above step (e), and determining as the rate of recognition error a value that the number of retrials is divided by the number of trials.

21. The method as claimed in claim 17, further comprising the sub-step of providing a message informing the user that the corresponding voice data have not been registered, in case where the first difference value is no less than the threshold value, in the above step (d).

* * * * *